(12) United States Patent
Yi et al.

(10) Patent No.: US 12,361,588 B1
(45) Date of Patent: Jul. 15, 2025

(54) MACHINE VISION-BASED CRYSTALLIZER NOZZLE CENTERING METHOD AND SYSTEM

(71) Applicant: Wuhan University of Science and Technology, Wuhan (CN)

(72) Inventors: Cancan Yi, Wuhan (CN); Tao Huang, Wuhan (CN); Han Xiao, Wuhan (CN); Daiwei Bi, Wuhan (CN); Yang Liu, Wuhan (CN); Lei Zhang, Wuhan (CN)

(73) Assignee: Wuhan University of Science and Technology, Wuhan (CN)

( * ) Notice: Subject to any disclaimer, the term of this patent is extended or adjusted under 35 U.S.C. 154(b) by 0 days.

(21) Appl. No.: 19/071,710

(22) Filed: Mar. 5, 2025

(30) Foreign Application Priority Data

Mar. 14, 2024 (CN) .......................... 202410289118.4

(51) Int. Cl.
*G06T 7/73* (2017.01)
*B22D 11/16* (2006.01)
(Continued)

(52) U.S. Cl.
CPC ................ *G06T 7/73* (2017.01); *B22D 11/16* (2013.01); *G06N 3/006* (2013.01); *G06T 7/0004* (2013.01);
(Continued)

(58) Field of Classification Search
CPC ......... B22D 11/00; B22D 11/16; B22D 11/18; G06T 7/0002–001; G06T 2207/30108; G06T 2207/30164; G06T 7/70–75; G06T 7/13; G06T 7/155; G06T 2207/20036; G06T 2207/30172; G06N 3/006
See application file for complete search history.

(56) References Cited

FOREIGN PATENT DOCUMENTS

| CN | 106647599 A | * | 5/2017 | ............. G08C 17/02 |
| CN | 114799151 A | * | 7/2022 | ............. B22D 11/18 |

(Continued)

OTHER PUBLICATIONS

Dorigo, Marco, Mauro Birattari, and Thomas Stutzle. "Ant colony optimization." IEEE computational intelligence magazine 1.4 (2007): 28-39. (Year: 2007).*

(Continued)

*Primary Examiner* — Geoffrey E Summers

(57) ABSTRACT

A machine vision-based crystallizer nozzle centering method includes: S1, performing image acquisition on a tundish car lower nozzle and a crystallizer nozzle; S2, performing an edge enhancement using guide image filtering; S3, performing an edge extraction on a first image set using an ant algorithm, and obtaining a second image set; S4, performing smoothing processing and a centerline extraction on the second image set using a morphological closing operation respectively, and obtaining a centerline equation; S5, centering the crystallizer nozzle in a width direction according to the centerline equation, and obtaining a width centering result; S6, installing two second image acquisition apparatuses symmetrically on a center extension line of the crystallizer nozzle, and obtaining a thickness centering result using the second image acquisition apparatuses; and S7, adjusting a position of a tundish car according to the width centering result and the thickness centering result.

6 Claims, 7 Drawing Sheets

(51) Int. Cl.
*G06N 3/006* (2023.01)
*G06T 7/00* (2017.01)
*G06T 7/13* (2017.01)
*G06T 7/155* (2017.01)

(52) U.S. Cl.
CPC ............... *G06T 7/13* (2017.01); *G06T 7/155* (2017.01); *G06T 2207/20036* (2013.01); *G06T 2207/30164* (2013.01); *G06T 2207/30172* (2013.01)

(56) References Cited

FOREIGN PATENT DOCUMENTS

| CN | 115026271 A | * | 9/2022 | ............... B22D 2/00 |
| CN | 115502384 A | * | 12/2022 | ............. B22D 11/16 |
| CN | 116213653 A | * | 6/2023 | ............... B22D 2/00 |

OTHER PUBLICATIONS

Rajeswari, R., and R. Rajesh. "A modified ant colony optimization based approach for image edge detection." 2011 International Conference on Image Information Processing. IEEE, 2011. (Year: 2011).*

Shi, Qingnan, et al. "Image edge detection based on the Canny edge and the ant colony optimization algorithm." 2019 12th International Congress on Image and Signal Processing, BioMedical Engineering and Informatics (CISP-BMEI). IEEE, 2019. (Year: 2019).*

Zhang, Jian, et al. "An ant colony optimization algorithm for image edge detection." 2010 International Conference on Artificial Intelligence and Computational Intelligence. vol. 2. IEEE, 2010. (Year: 2010).*

Shapiro, Linda and George Stockman. Computer Vision. Mar. 2000. (Year: 2000).*

* cited by examiner

I

| A1 | B1 | C1 | B1 | A1 |
|----|----|----|----|----|
| A1 | B1 | C1 | B1 | A1 |
| A1 | B1 | u,v | B1 | A1 |
| A1 | B1 | C1 | B1 | A1 |
| A1 | B1 | C1 | B1 | A1 |

II

| A1 | B1 | A5 | B4 | A6 |
|----|----|----|----|----|
| C2 | D4 | C1 | D5 | C4 |
| D1 | A2 | u,v | D3 | B6 |
| B3 | C6 | D6 | B2 | C3 |
| D2 | B5 | C5 | A3 | A4 |

III

|    | B1 |     | B4 |    |
|----|----|-----|----|----|
| C2 | D4 |     | D5 | C4 |
|    | A2 | u,v | D3 |    |
| B3 | C6 | D6  | B2 | C3 |
|    | B5 |     | A3 |    |

FIG. 4

MACHINE VISION-BASED CRYSTALLIZER NOZZLE CENTERING METHOD AND SYSTEM

TECHNICAL FIELD

The present disclosure relates to the technical field of crystallizer nozzle centering, in particular to a machine vision-based crystallizer nozzle centering method and system.

BACKGROUND

With the continuous development of industrial production, a crystallization process plays an important role in the chemical industry and other fields. The design and position of a crystallizer nozzle have an important impact on the efficiency of the crystallization process and product quality, and a reasonable design is needed to ensure that a solvent can be effectively discharged, while avoiding the loss of a crystallization product. In a continuous casting process, a centering technology of a tundish car lower nozzle in a width direction and thickness direction of the crystallizer nozzle ensures that liquid steel flows smoothly from a ladle into the position of the crystallizer nozzle, so as to ensure uniform solidification of the liquid steel in the continuous casting process and high-quality production of a continuous casting billet.

Centering of the crystallizer nozzle is always one of key problems in process control. In the existing crystallizer nozzle, manual intervention is required to manually adjust and monitor the crystallizer nozzle, and because a crystalline material generated during the crystallization process may block the nozzle, a solvent cannot be discharged smoothly, thus leading to the inability to accurately identify an edge of the crystallizer nozzle, which affects the accuracy of the centering of the crystallizer nozzle.

SUMMARY

According to an aspect of some embodiments of the present disclosure, a machine vision-based crystallizer nozzle centering method is provided, including the following steps:

S1, installing a first image acquisition apparatus on a continuous casting platform to perform image acquisition on a tundish car lower nozzle and a crystallizer nozzle, and obtaining an initial image of the tundish car lower nozzle and an initial image of the crystallizer nozzle; wherein the continuous casting platform is further provided with a tundish car and a crystallizer;

S2, performing an edge enhancement on the initial image of the tundish car lower nozzle and the initial image of the crystallizer nozzle respectively using guide image filtering, and obtaining a first image set;

S3, performing an edge extraction on the first image set using an ant algorithm, and obtaining a second image set;

S4, performing smoothing processing and a centerline extraction on the second image set using a morphological closing operation respectively, and obtaining a centerline equation of an edge image of the tundish car lower nozzle and a centerline equation of an edge image of the crystallizer nozzle;

S5, centering the crystallizer nozzle in a width direction according to the centerline equation of the edge image of the tundish car lower nozzle and the centerline equation of the edge image of the crystallizer nozzle, and obtaining a width centering result;

S6, installing two second image acquisition apparatuses symmetrically on a center extension line of the crystallizer nozzle, centering the crystallizer nozzle in a thickness direction using the second image acquisition apparatuses, and obtaining a thickness centering result; and S7, adjusting a position of the tundish car on the continuous casting platform according to the width centering result and the thickness centering result.

According to an aspect of some embodiments of the present disclosure, a machine vision-based crystallizer nozzle centering system is provided, adopts the above crystallizer nozzle centering method, and includes:

a first acquisition module, configured to install a first image acquisition apparatus on a continuous casting platform to perform image acquisition on a tundish car lower nozzle and a crystallizer nozzle, and obtain an initial image of the tundish car lower nozzle and an initial image of the crystallizer nozzle;

an edge processing module, configured to perform an edge enhancement on the initial image of the tundish car lower nozzle and the initial image of the crystallizer nozzle respectively using guide image filtering, obtain a first image set, perform an edge extraction on the first image set using an ant algorithm, and obtain a second image set;

a centerline positioning module, configured to perform smoothing processing and a centerline extraction on the second image set using a morphological closing operation respectively, and obtain a centerline equation of an edge image of the tundish car lower nozzle and a centerline equation of an edge image of the crystallizer nozzle;

a width centering module, configured to center the crystallizer nozzle in a width direction according to the centerline equation of the edge image of the tundish car lower nozzle and the centerline equation of the edge image of the crystallizer nozzle, and obtain a width centering result;

a second acquisition module, configured to install two second image acquisition apparatuses symmetrically on a center extension line of the crystallizer nozzle, center the crystallizer nozzle in a thickness direction using the second image acquisition apparatuses, and obtain a thickness centering result;

a thickness centering module, configured to center the crystallizer nozzle in the thickness direction using the second image acquisition apparatuses, and obtain the thickness centering result; and a position adjusting module, configured to adjust a position of a tundish car according to the width centering result and the thickness centering result.

BRIEF DESCRIPTION OF DRAWINGS

To describe the technical solutions in the embodiments of the present invention or in the related art more clearly, the following briefly introduces the accompanying drawings for describing the embodiments or the related art. Apparently, the accompanying drawings in the following description show merely some embodiments of the present invention, and a person of ordinary skill in the art may still derive other drawings from the accompanying drawings without creative efforts.

FIG. 4 is a structural diagram of different factions in an ant algorithm of a crystallizer nozzle centering method provided by one or more embodiments of the present disclosure.

DETAILED DESCRIPTION

The technical solutions in the embodiments of the present invention will be clearly and completely described below with reference to the embodiments of the present invention, and it is obvious that the described embodiments are only a part of the embodiments of the present invention but not all of them. All other embodiments obtained by a person of ordinary skill in the art based on the embodiments of present disclosure without making creative efforts shall fall within the protection scope of present disclosure.

Figure 1:
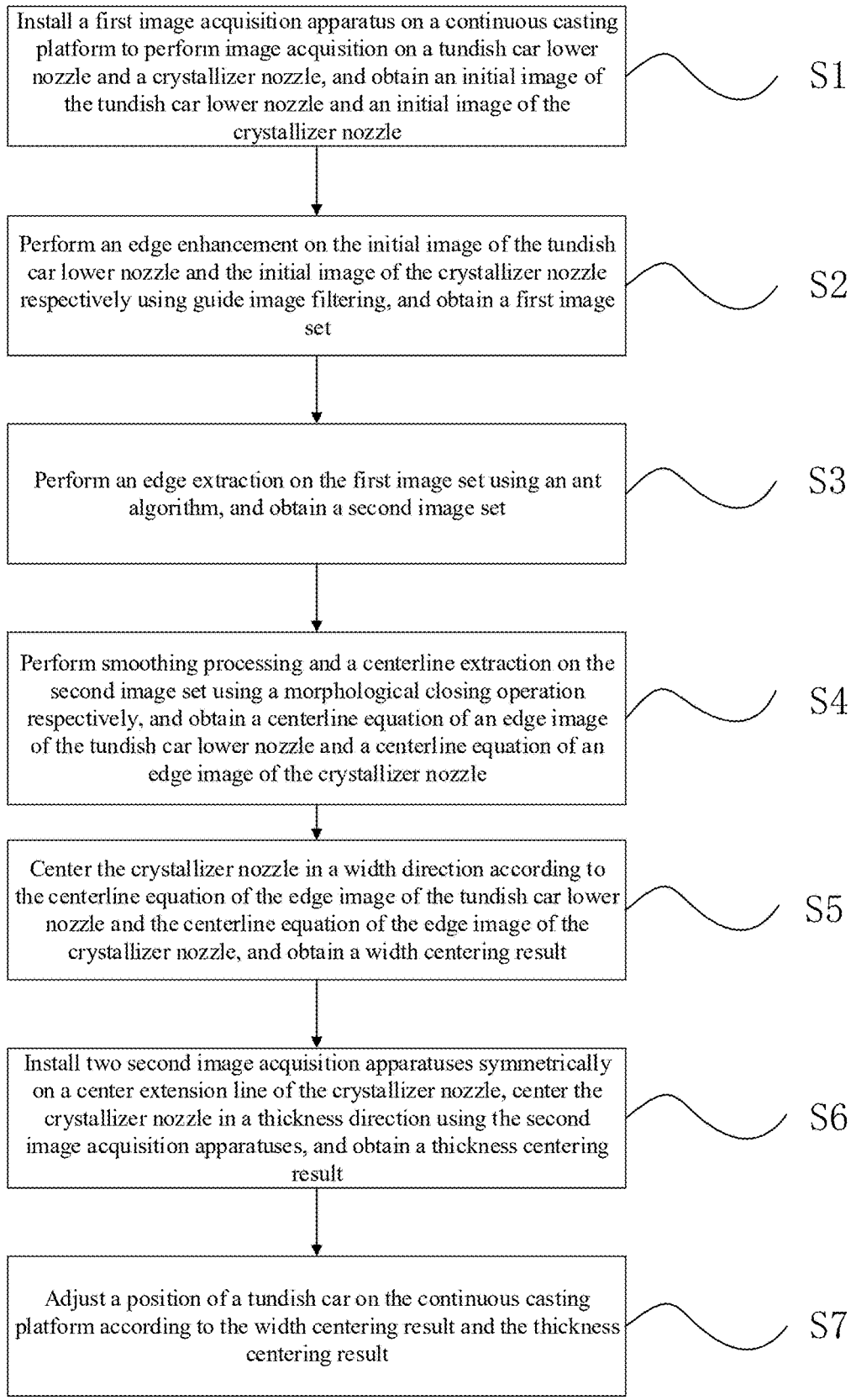
FIG. 1 is a flowchart of a crystallizer nozzle centering method provided by one or more embodiments of the present disclosure.
Figure 2:
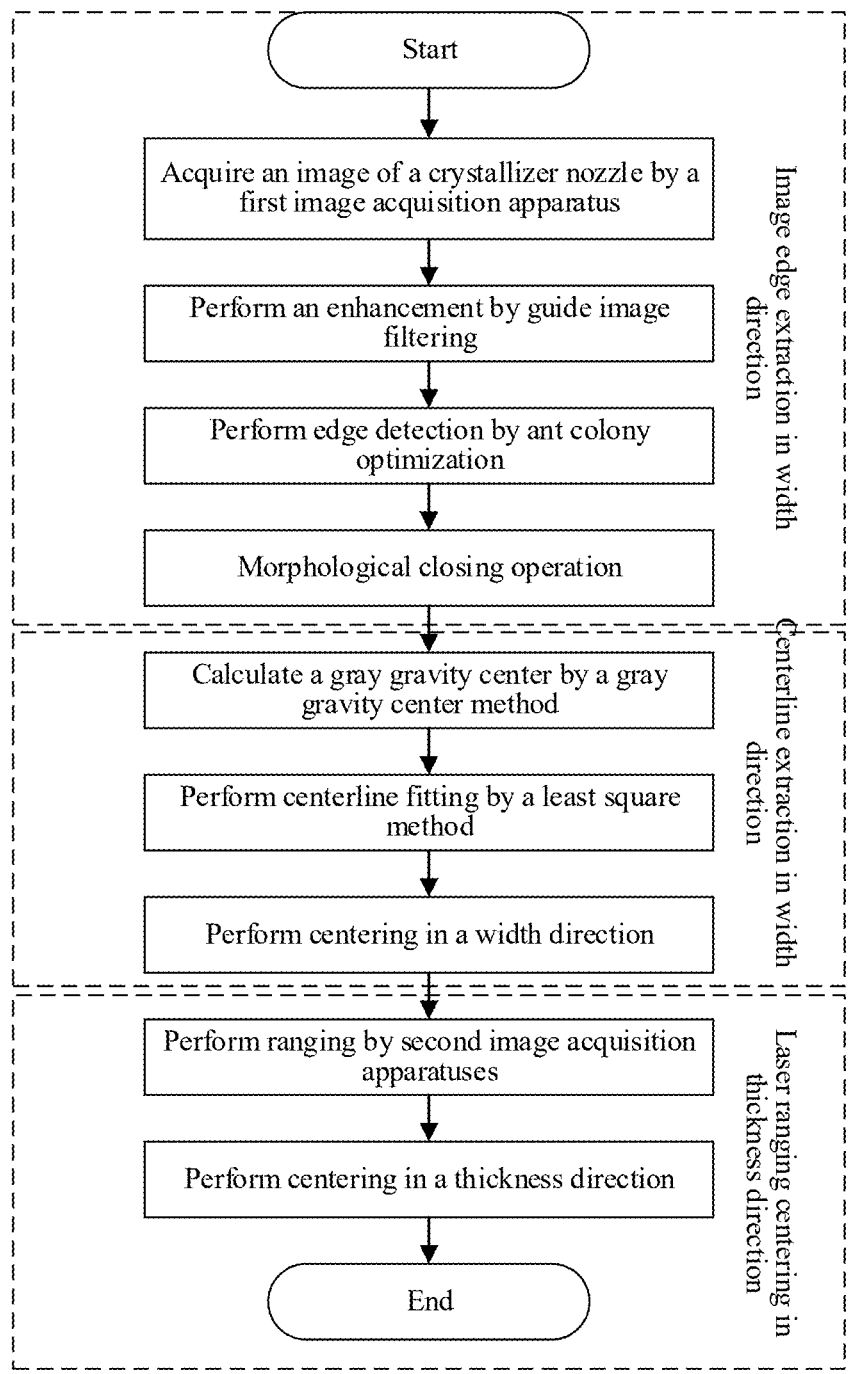
FIG. 2 is a specific flowchart of a crystallizer nozzle centering method provided by one or more embodiments of the present disclosure.

As shown in FIG. 1 and FIG. 2, the present disclosure provides a machine vision-based crystallizer nozzle centering method, including the following steps:

S1, installing a first image acquisition apparatus on a continuous casting platform to perform image acquisition on a tundish car lower nozzle and a crystallizer nozzle, and obtaining an initial image of the tundish car lower nozzle and an initial image of the crystallizer nozzle; wherein the continuous casting platform is further provided with a tundish car and a crystallizer;

S2, performing an edge enhancement on the initial image of the tundish car lower nozzle and the initial image of the crystallizer nozzle respectively using guide image filtering, and obtaining a first image set;

S3, performing an edge extraction on the first image set using an ant algorithm, and obtaining a second image set;

S4, performing smoothing processing and a centerline extraction on the second image set using a morphological closing operation respectively, and obtaining a centerline equation of an edge image of the tundish car lower nozzle and a centerline equation of an edge image of the crystallizer nozzle;

S5, centering the crystallizer nozzle in a width direction according to the centerline equation of the edge image of the tundish car lower nozzle and the centerline equation of the edge image of the crystallizer nozzle, and obtaining a width centering result;

S6, installing two second image acquisition apparatuses symmetrically on a center extension line of the crystallizer nozzle, centering the crystallizer nozzle in a thickness direction using the second image acquisition apparatuses, and obtaining a thickness centering result; and S7, adjusting a position of the tundish car on the continuous casting platform according to the width centering result and the thickness centering result.

Figure 3:
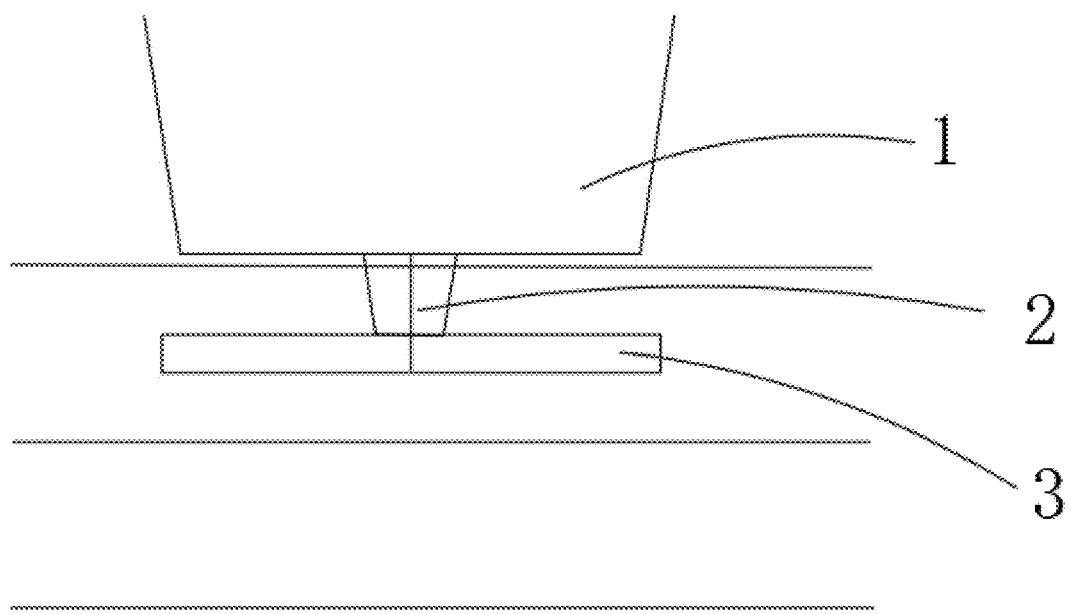
FIG. 3 is a schematic diagram of a width direction of a crystallizer nozzle centering method provided by one or more embodiments of the present disclosure.

As shown in FIG. 3, in the embodiment of the present application, position and shape information of the tundish car lower nozzle 2 and the crystallizer nozzle 3 are accurately acquired by the first image acquisition apparatus, edge enhancement and detection are performed using a guide image filtering and optimization method, so that contours of the tundish car lower nozzle 2 and the crystallizer nozzle 3 are clearly visible, the centerline equations of the edge images of the tundish car lower nozzle 2 and the crystallizer nozzle 3 are obtained respectively through the morphological closing operation and centerline extraction, so as to realize precise positioning of the crystallizer nozzle 3 in the width direction, the crystallizer nozzle 3 is centered in the width direction according to the centerline equation to obtain the width centering result, the crystallizer nozzle 3 is centered in the thickness direction using the second image acquisition apparatuses to obtain the thickness centering result, and finally, the position of the tundish car 1 is adjusted according to the width centering result and the thickness centering result to ensure its centering with the crystallizer nozzle 3, so as to improve the precision and stability of a production process of a continuous casting process.

In an embodiment of the present application, guide filtering processing is performed on the initial images using a guide filter in step S2, and step S2 specifically includes the following.

S21, a guide image $I_u$ and a target image $p_u$ are prepared, wherein the guide image $I_u$ and the one target image $p_u$ may be the same image; wherein the target image $p_u$ is an initial image.

S22, assuming that a linear transformation in a selected window $\omega_k$ centered on a pixel k is used as a guide filter, an image $q_u$ is obtained after filtering by the guide filter, and a formula for filtering using the guide filter is:

$$q_u = \phi_k I_u + \alpha_k \forall_u \in \omega_k$$

where $q_u$ denotes an image after filtering the target image $p_u$, $\phi_k$ and $\alpha_k$ are both linear coefficients and are constants, $I_u$ denotes the guide image, which may be set according to an actual situation, and u denotes the number of initial images.

S23, the image $q_u$ is modeled to remove a noise, texture, etc., and a first image $q_i$ is obtained, with a following formula:

$$q_i = q_u - n_u$$

where $n_u$ denotes the noise.

S24, a minimized noise variance is determined to ensure a quality of the filtered image, wherein the minimized noise variance is:

$$\sum_{u \in \omega_k} \sigma^2(n_u) = \sum_{u \in \omega_k} (q_u - p_u)^2 = \sum_{u \in \omega_k} (\phi_k I_u + \alpha_k - p_u)^2$$

S25, a cost function is minimized in the window $\omega_k$, wherein a formula for the cost function is as follows:

$$E(\phi_k, \varphi) = \sum_{u \in \omega_k} \left[ (\phi_k I_u + \alpha_k - p_u)^2 + \varepsilon \phi_k^2 \right]$$

where $E(\phi_k, \alpha_k)$ denotes the cost function, E is a regularization parameter, and the cost function may be solved using a ridge regression model to obtain an optimal filtering result. After solving the cost function, the following may be obtained:

$$\phi_k = \frac{\frac{1}{|\omega|}\sum_{u \in \omega_k} I_u p_u - \mu_k \frac{1}{|\omega|}\sum_{u \in \omega_k} p_u}{\sigma_k^2 + \varepsilon}$$

$$\phi_k = \frac{1}{|\omega|} \sum_{u \in \omega_k} P_u - \phi_k \mu_k$$

where an average and variance of the guide image $I_u$ in the window $\omega_k$ are $\mu_k$ and $\sigma_k^2$ respectively, and the number of pixels in the window $\omega_k$ is $|\omega|$.

S26, for different windows, optimal parameter values are calculated in the image, a first image $q_u$ is obtained by applying a solution obtained from a ridge regression module, and an expression of the first image $q_u$ is:

$$q_u = \frac{1}{|\omega|} \sum_{u \in \omega_k} p_u(\phi_k I_u + \alpha_k)$$

Understandably, guide filtering is a self-adaptive filtering method that may adjust filtering parameters according to pixel values within a localized window, which in turn helps to reduce the noise in the image, especially a Gaussian noise and a salt and pepper noise, and unlike some conventional smoothing filters, the guide filtering may retain the edge information of the image while reducing the noise.

In the embodiment of the present application, minimizing the noise variance and minimizing the cost function allows the guide filter to efficiently remove the noise from the image, and performing the guide filtering processing on the initial image may maintain the detail and edge information of the image while reducing the noise.

In an embodiment of the present application, step S3 specifically includes the following.

S31, any image is selected in the first image set, m nodes are selected in the image, the m nodes are used as ants, and a pheromone amount of pixels of the m ants is set to an initial value of 0.0001.

S32, a local intensity of a position where each ant is located is calculated, a transition rule is formulated according to the local intensity, and the m ants are moved to an acceptable neighborhood according to a volatilization rate of pheromones.

S33, perception of the ants is denoted using a heuristic function, and a neighborhood of each ant is selected according to the heuristic function.

S34, any ant is selected from the m ants to be moved to a position in its 8 neighborhoods according to the heuristic function, a pheromone concentration of each ant is updated, and a pheromone concentration of each node is estimated.

S35, a second image is determined according to the pheromone concentration of the node and a movement path of the ant, and steps S31-S32 are repeated until all second images corresponding to the first image set are determined and constitute the second image set.

Understandably, an ant colony algorithm has certain self-adaptability, which can automatically adjust a search path of the ants according to characteristics of the image and the pheromone concentration, and is suitable for the detection of different types of images and edge features. Meanwhile, the ant colony algorithm has a certain parallel performance, which may accelerate the process of edge extraction and improve the efficiency and practicality of the algorithm through reasonable design and implementation. By combining the ant colony algorithm with the heuristic function to update the pheromones, the present application combines a search capability of the ant colony algorithm with the accuracy of edge extraction, which may effectively perform the edge extraction on the image and improve the accuracy and precision of detection.

In the embodiment of the present application, the image pixels of the first image set are assumed to be the nodes of the image, a global search of the image is realized by selecting m nodes as an ant colony, the pheromone amount of the pixels of the ants is set to the initial value of 0.0001 to ensure that the ants have certain pheromone guidance during a search process, the local intensity of the position where each ant is located is calculated, so that the ants are more inclined to select a region with a higher local intensity during a movement process, thus improving a local search capability of the ant algorithm, and at the same time, the formulation of the transition rule according to the local intensity may make the ants select a next position more intelligently when moving, which helps to improve the search efficiency of the algorithm. The use of the heuristic function may provide a larger perceptual range, enabling the ants to perceive a surrounding environment more comprehensively. Moving the ants and updating the pheromone concentration according to the heuristic function may enable the ants to adjust the paths according to environmental changes in real time during the search process. At the same time, updating the pheromone concentration and estimating the pheromone concentration of each node make the algorithm more accurately reflect the features and edge information of different regions in the image, the edge extraction is performed according to the pheromone concentration of the nodes and the movement paths of the ants, and the edge extraction of the image is realized by using a pheromone distribution searched for by the ant colony algorithm so as to obtain the second image, which helps to improve an effect and accuracy of the edge extraction.

Optionally, the heuristic function uses a 5×5 window, which in turn improves the efficiency of the ant search. A user may set a size of the window according to the actual use, which is not specifically limited by the present application.

Specifically, the transition rule in step S32 is formulated according to the pheromone concentration and the heuristic function, wherein an expression of the heuristic function is as follows:

$$\eta_{u,v} = (\max[\eta_1, \eta_2, \eta_3])^2 \frac{1}{1 + (I\eta_{max})^2}$$

where $\eta_{u,v}$ denotes the heuristic function, $\eta_1$ denotes a difference of an image intensity of a first node, $\eta_2$ denotes a difference of an image intensity of a second node, $\eta_3$ denotes a difference of an image intensity of a third node, $\text{In}_{max}$ denotes a maximal intensity value among the three image nodes, and the first node, the second node, and the third node are three nodes moved randomly by the ants.

Further, a formula for calculating a difference of an image intensity is as follows:

$$\eta_1=[\text{In}(u-2,v-2)+\text{In}(u-1,v-2)+\text{In}(u,v-2)+\text{In}(u+1,v-2)+\text{In}(u+2,v-2)]-[\text{In}(u-2,v+2)+\text{In}(u-1,v+2)+\text{In}(u,v+2)+\text{In}(u+1,v+2)+\text{In}(u+2,v+2)]$$

$$\eta_2=[\text{In}(u-2,v-1)+\text{In}(u-1,v-1)+\text{In}(u,v-1)+\text{In}(u+1,v-1)+\text{In}(u+2,v-1)]-[\text{In}(u-2,v+1)+\text{In}(u-1,v+1)+\text{In}(u,v+1)+\text{In}(u+1,v+1)+\text{In}(u+2,v+1)]$$

$$\eta_1=[\text{In}(u-2,v)+\text{In}(u-1,v)]-[\text{In}(u+1,v)+\text{In}(u+2,v)]$$

where $\text{In}(u, v)$ denotes an intensity at a position $(u, v)$.

Further, in step S32, a probability that the ants are moved to the acceptable neighborhood according to the volatilization rate of the pheromones is calculated by a formula:

$$p_{(i,j)(u,v)}^n = \begin{cases} \dfrac{\left(\tau_{(u,v)}^{(n-1)}\right)^\alpha (\eta_{u,v})^\beta (\sigma_{u,v})^\gamma}{\sum_{(u,v)\in\Omega(u,v)}\left(\left(\tau_{(u,v)}^{(n-1)}\right)^\alpha (\eta_{u,v})^\beta (\sigma_{u,v})^\gamma\right)} & \text{if } (u,v) \in \Omega(i,j) \\ 0 & \text{otherwise} \end{cases}$$

where $p_{(i,j)(u,v)}^n$ denotes a probability that the ant is moved to an acceptable neighborhood $(i,j)$ for an $n^{th}$ time at a node $(u,v)$, $\tau_{(u,v)}^{(n-1)}$ denotes a pheromone amount at the node $(u,v)$ for an $(n-1)^{th}$ time, $\eta_{u,v}$ denotes a heuristic informative value of the node $(u,v)$, $\sigma_{u,v}$ denotes an adjustment parameter at the node $(u,v)$, $\alpha$ denotes an importance degree of a pheromone, $\beta$ denotes an importance degree of information in the heuristic function, $\gamma$ denotes a coefficient of the adjustment parameter, $\Omega(i, j)$ denotes an acceptable neighborhood of the ant, and $\Omega(u, v)$ denotes a set of neighboring pixel points that the ant may be moved to from a current pixel point.

A formula for the adjustment parameter $\sigma_{u,v}$ is as follows:

$$\sigma_{u,v} = \frac{\log(R_K^N)}{d_{i,j} \times \phi_{N_c}^2}$$

where $d_{i,j}$ denotes an ideal attribute value of the adjustment parameter, $\phi_{N_c}$ denotes a sub-block gradient ratio, and $R_k^{N_c}$ denotes a threshold of a $k^{th}$ ant at an $N_c^{th}$ time.

Understandably, in the ant colony algorithm, a threshold of an ant is often referred to as an exploration probability of the ant or an importance factor of the heuristic information. It is used to decide whether the ant adopts an exploration strategy or a tracking strategy using existing pheromones when selecting a next target. The threshold of the ant represents a preference level of the ant for exploration. When the threshold of the ant is smaller, the ant prefers to select exploring a new path to discover a better solution, while when the threshold of the ant is larger, the ant prefers to select an existing path to utilize the existing pheromone information.

In an embodiment of the present application, assuming that pixels of the first image are nodes, m nodes are randomly selected in the first image as ants, a pheromone amount of a pixel of each ant is taken as 0.0001, the ant is moved from its initial position $(u,v)$ to its acceptable neighborhood $\Omega(i, j)$ according to the probability, i.e., the transition rule, and a 5×5 heuristic function is used to denote the perception of the ant to nodes near the node $(u,v)$. As shown in FIG. 4, three different faction representations are set, the figure is a structure of different factions, pixels of the same color are taken as a group (where different letters represent different color numbers), a heuristic value $\eta_{u,v}$ of the node $(u,v)$ is calculated by subtracting a sum of pixel values of each group and a sum of a corresponding group of the same color, and a maximum value is selected for a differential pair. Any ant is selected from m ants to be moved, each selected ant may be moved to its 8 neighborhoods, i.e., each ant is moved to the node with a highest probability, as shown in the figure, the process is repeated, knowing that L movements are performed, and then, each ant has a fixed length of memory, denoted as 1. An edge extraction image of the first image, i.e., the second image, is determined according to 1 nodes that the ant is moved through.

In a further embodiment of the present application, the pheromone concentration of each ant is iteratively updated by moving the ant by L steps, and the update is calculated by a following formula:

$$\tau_{(u,v)}(\text{NEW}) = \left[\rho(n)\sum_{s=1}^{s}\Delta\tau_{(u,v)}^s + \tau_{(u,v)}(\text{old})(1-\rho(n))\right]_{\tau_{min}}^{\tau_{max}}$$

where $\tau_{(u,v)}(\text{NEW})$ denotes a pheromone amount at the node $(u,v)$ after the update, $\tau_{(u,v)}(\text{old})$ denotes a pheromone amount at the node $(u,v)$ before the update, $\Delta\tau_{(u,v)}^s$ denotes a difference in pheromones before and after updating an information concentration of an $s^{th}$ ant, $\rho(n)$ denotes a volatilization rate of pheromones, s denotes a total number of ants at the node $(u,v)$, $\tau_{min}$ denotes a minimum pheromone value, and $\tau_{max}$ denotes a maximum pheromone value.

Further, the pheromone amount at each node $(u,v)$ is calculated by a following formula:

$$\Delta\tau_{(u,v)}^s = \begin{cases} \eta_{(u,v)} & \text{if } s^{th} \text{ ant meets node}(u,v) \text{ and } \eta_{(u,v)} > t \\ 0 & \text{otherwise} \end{cases}$$

where $s^{th}$ denotes the $s^{th}$ ant, and t is a preset threshold, i.e., limiting a deposition amount of pheromones.

Further, the adjustment parameter $\sigma_{u,v}$ also improves the volatilization rate of information in a dynamic change manner, and the volatilization rate $\rho(n)$ of information is calculated by a following formula:

$$\rho(n) = \begin{cases} \rho_0 & n < N_c \\ \sigma_{u,v}\rho_0 & n \geq N_c \end{cases}$$

where $N_c$ denotes the number of iterative updates.

Figure 5:
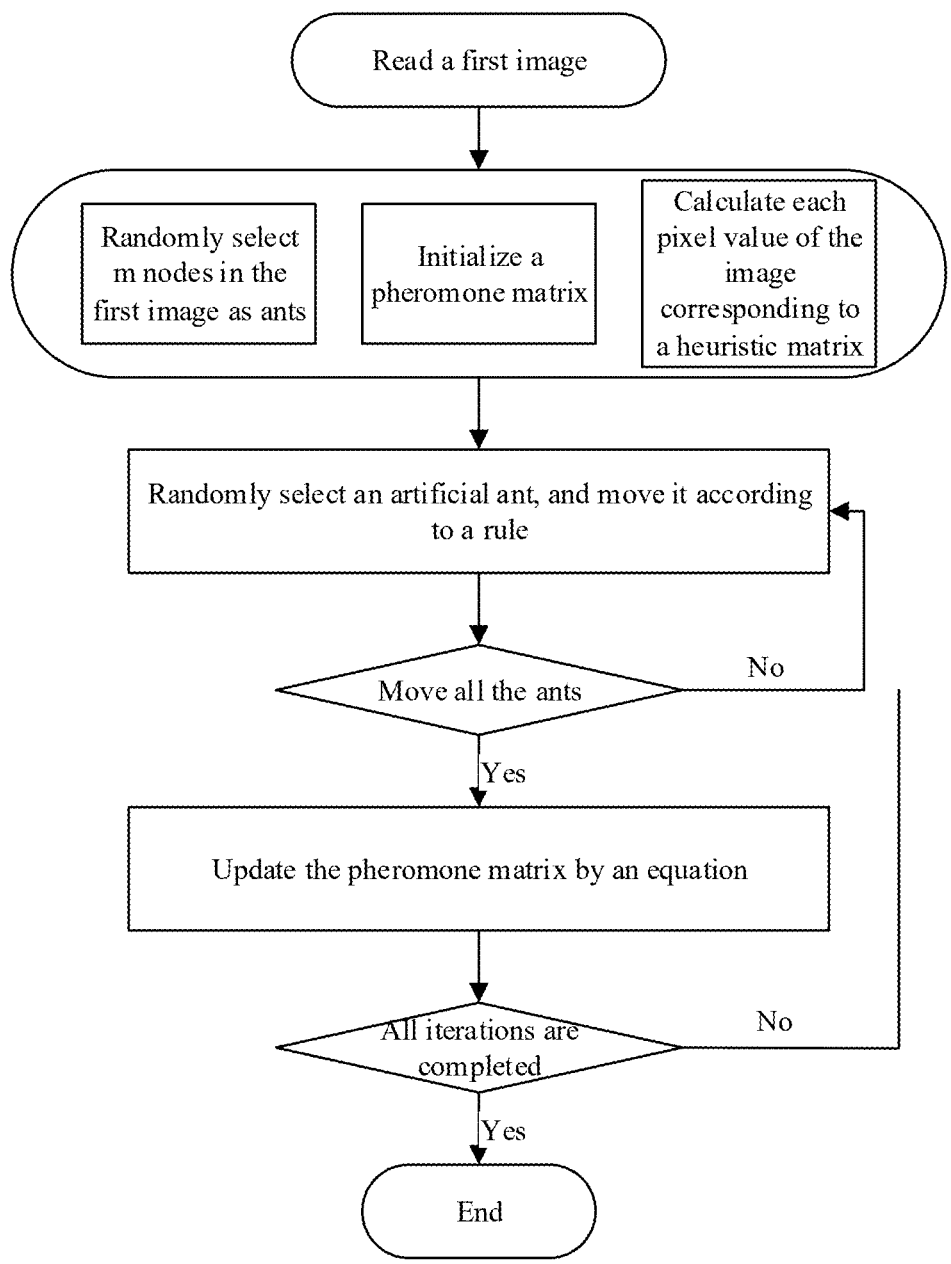
FIG. 5 is a flowchart of an ant algorithm of a crystallizer nozzle centering method provided by one or more embodiments of the present disclosure.
Figure 6:
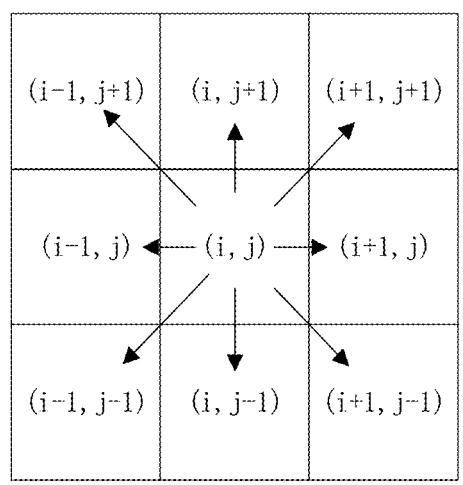
FIG. 6 is a schematic diagram of an ant neighborhood of a crystallizer nozzle centering method provided by one or more embodiments of the present disclosure.

In the embodiment of the present application, the ants are moved to the acceptable neighborhoods, thereby updating the ant colony algorithm, as shown in FIG. 5 and FIG. 6. FIG. 5 is a flowchart of an ant algorithm. FIG. 6 is a schematic diagram of a neighborhood of an ant. A first image is read, and m nodes are randomly selected in the first image as ants. A pheromone matrix of the ants is initialized, and each pixel value of the image corresponding to the heuristic matrix is calculated. Any ant is selected from the m ants, a position of the current ant is (i,j), and the ant is moved L steps to the acceptable neighborhood according to a rule. Whether all the ants are moved is judged. When all the ants are moved, the pheromone matrix is updated, whether iterations are completed is judged, and if not, any of the m ants continues to be selected and is moved according to the rule until all the iterations are completed. Global search and local optimization are performed on the image by the ant algorithm, combined with intelligent search by the pheromone guide and heuristic function, so as to realize the perception and extraction of image features, and then improve the effect and accuracy of the edge extraction.

In an embodiment of the present application, step S4 specifically includes the following.

S41, an expansion operation and an erosion operation are performed on the second image set respectively, and a third image set is obtained.

S42, a gray value and a position of a gray gravity center are obtained for the third image set respectively, and a position of a gray gravity center of a pixel point on the edge image of the tundish car lower nozzle and a position of a gray gravity center of a pixel point on the edge image of the crystallizer nozzle are obtained.

S43, the position of the gray gravity center of the pixel point on the edge image of the tundish car lower nozzle and the position of the gray gravity center of the pixel point on the edge image of the crystallizer nozzle are fitted using a least square method respectively, and the centerline equation of the edge image of the tundish car lower nozzle and the centerline equation of the edge image of the crystallizer nozzle are obtained.

Understandably, a formula for step S41 is as follows:

$$A \cdot B = (A \oplus B) \ominus B$$

where A denotes the second image, B denotes a structural element, $\oplus$ denotes the expansion operation, and $\ominus$ denotes the erosion operation.

By performing the morphological closing operation on the second image, an effect of smoothing the contour is achieved, at the same time, slender gullies and narrow discontinuities in the second image may also be filled, and smaller holes may be eliminated.

A formula for calculating the gray value of the pixel point is as follows:

$$f(w) = \begin{cases} 0 & f(w) \le f_{th} \\ f(w) & f(w) > f_{th} \end{cases}$$

where f(w) denotes a gray value of a pixel point w, $f_{th}$ denotes a set gray threshold, which may be set according to an actual situation, upper and lower limit intervals of a pixel bar of an $x_w^{th}$ column are obtained as $[a(x_w), b(x_w)]$ by the set gray threshold, and a weighting formula of the gray gravity center is as follows:

$$y(x_w) = \sum_{y=a(x_w)}^{b(x_w)} y \times f(x_w, y) \bigg/ \sum_{y=a(x_w)}^{b(x_w)} f(x_w, y)$$

where $f(x_w, y)$ denotes a gray value at a pixel coordinate $(x_w, y)$, and $y(x_w)$ denotes a calculated vertical coordinate of a gravity center of the pixel bar of the $x_w$ column.

In the embodiment of the present application, data of center points of pixel bars extracted according to a gray gravity center method are basically distributed near a straight line, and an equation of the straight line is:

$$\hat{y} = \hat{k}\hat{x} + \hat{b}$$

where $\hat{y}$ denotes the equation of the straight line, $\hat{k}$ and $\hat{b}$ denote a slope and intercept of the straight line, and $\hat{x}$ denotes a center point of a pixel bar.

A formula for a fitting criterion of the least square method is as follows:

$$E_{min} = \sum_{i=1}^{n} [\hat{y}_i - (\hat{k}\hat{x} + \hat{b})]$$

where $E_{min}$ denotes the fitting criterion, and $\hat{y}_i$ denotes an equation of an $i^{th}$ straight line.

In the embodiment of the present application, a target object in the image is expanded by the expansion operation to obtain a more complete target region, and the target object in the image is shrunk by using the erosion operation to remove a noise and small discontinuous parts, which in turn makes the edge clearer. The positions and shapes of the tundish car lower nozzle and the crystallizer nozzle are determined by the position of the gray gravity center, which improves the identification and positioning precision of the tundish car lower nozzle and the crystallizer nozzle, and further improves the accuracy of the centering of the crystallizer nozzle.

In an embodiment of the present application, step S6 specifically includes the following.

S61, the two second image acquisition apparatuses are symmetrically installed on the center extension line in a horizontal width direction of the crystallizer of the continuous casting platform.

S62, the tundish car lower nozzle is centered with the crystallizer nozzle in the width direction, so that the tundish car lower nozzle is located on the centerline of the crystallizer nozzle.

S63, distances between a bus of the tundish car lower nozzle and the second image acquisition apparatuses are measured using the second image acquisition apparatuses, and a first distance and a second distance are obtained; wherein the first distance and the second distance are the distances between the tundish car lower nozzle and the two second image acquisition apparatuses respectively.

S64, the crystallizer nozzle is centered in the thickness direction according to the first distance and the second distance, and the thickness centering result is obtained.

Figure 7:
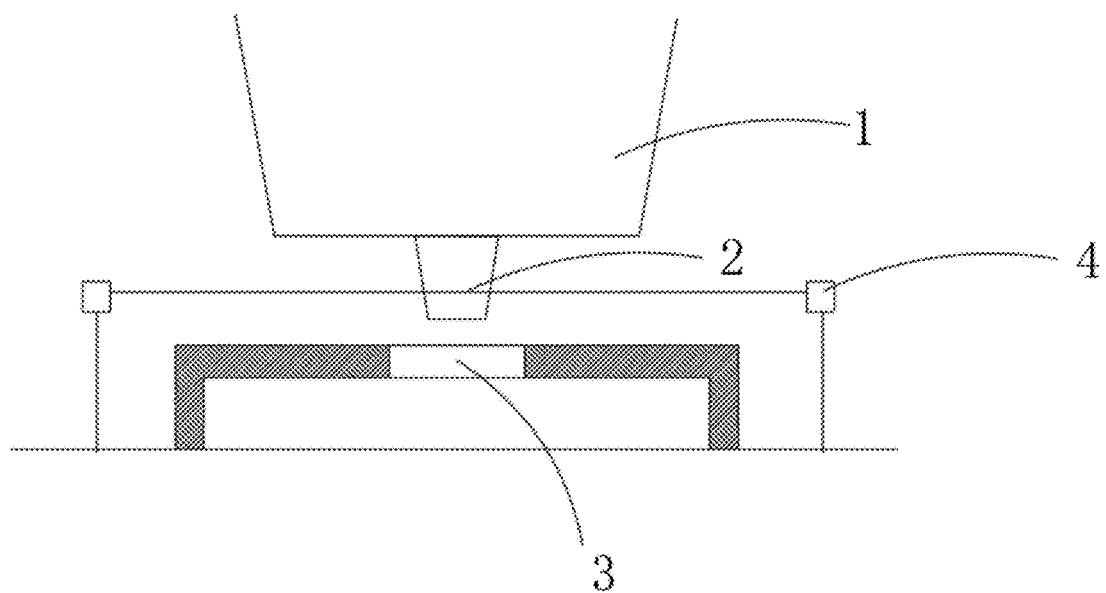
FIG. 7 is a schematic diagram of a width direction of a crystallizer nozzle centering method provided by one or more embodiments of the present disclosure.

As shown in FIG. 7, in the embodiment of the present application, all-round image acquisition is realized in the horizontal width direction of the crystallizer using the second image acquisition apparatuses 4, which ensures that an observation angle of the crystallizer nozzle is more comprehensive, so that the accuracy and stability of a centering operation are improved. The tundish car lower nozzle is centered with the crystallizer nozzle in the width direction, so that the tundish car lower nozzle is located on the centerline of the crystallizer nozzle, which ensures the centering of the tundish car lower nozzle with the crystallizer nozzle in the horizontal width direction. By measuring the distances between the bus of the tundish car lower nozzle and the second image acquisition apparatuses 4, the position of the crystallizer nozzle in the thickness direction is determined, which facilitates the adjustment of the crystallizer nozzle in the thickness direction, so as to improve the uniformity and quality of a product. By adjusting the centering in the thickness direction, the uniformity and stability of the casting billet in the thickness direction are ensured.

In an embodiment of the present application, the second image acquisition apparatuses 4 are laser sensors, and laser ranging centering is used for the crystallizer nozzle in the thickness direction.

Understandably, when the laser sensors are used for ranging, a laser emitting diode first fires a laser pulse at a target. After reflection from the target, laser light is scattered in all directions, and some of scattered light returns to a sensor receiver, is received by an optical system and is then imaged onto an avalanche photodiode. The avalanche photodiode is an optical sensor with an internal amplification function, so that it can detect an extremely weak light signal and convert it into a corresponding electrical signal. The time taken by the light pulse to travel to and from a point to be measured is measured, multiplied by the speed of light and divided by 2, so that a distance to the target to be measured may be calculated.

As described in the figure, in the embodiment of the present application, in order to realize the centering of the crystallizer nozzle 3 and the tundish car lower nozzle 2 in the thickness direction, the distance measurement is performed using off-the-shelf laser sensors, which realizes the accurate measurement of the crystallizer nozzle 3 in the thickness direction, so that a positional error can be discovered in time and adjusted when the positional error is discovered. Specifically, the two laser sensors 4 are first symmetrically installed on the centerline extension line of the crystallizer nozzle 3 on the continuous casting platform. After the tundish car lower nozzle 2 is centered with the crystallizer nozzle 3 in the width direction, the tundish car lower nozzle 2 is just located on the centerline of the crystallizer nozzle 3. At this time, distances of the bus of the tundish car lower nozzle 2 from the laser sensors are measured by the laser sensors, so that the distances of the tundish car lower nozzle 2 from the laser sensors on two sides can be obtained respectively. By comparing the distances of the tundish car lower nozzle 2 from the laser sensors on the left and right sides, it is possible to know whether the position of the tundish car lower nozzle 2 in the thickness direction is to the left or to the right, and thus a movement distance is provided to a control system of the tundish car 1 to realize the automatic centering in the thickness direction of the crystallizer.

The present disclosure provides a machine vision-based crystallizer nozzle centering system, adopts the above crystallizer nozzle centering method, and includes:
a first acquisition module, configured to install a first image acquisition apparatus on a continuous casting platform to perform image acquisition on a tundish car lower nozzle and a crystallizer nozzle, and obtain an initial image of the tundish car lower nozzle and an initial image of the crystallizer nozzle;
an edge processing module, configured to perform an edge enhancement on the initial image of the tundish car lower nozzle and the initial image of the crystallizer nozzle respectively using guide image filtering, obtain a first image set, perform an edge extraction on the first image set using an ant algorithm, and obtain a second image set;
a centerline positioning module, configured to perform smoothing processing and a centerline extraction on the second image set using a morphological closing operation respectively, and obtain a centerline equation of an edge image of the tundish car lower nozzle and a centerline equation of an edge image of the crystallizer nozzle;
a width centering module, configured to center the crystallizer nozzle in a width direction according to the centerline equation of the edge image of the tundish car lower nozzle and the centerline equation of the edge image of the crystallizer nozzle, and obtain a width centering result;
a second acquisition module, configured to install two second image acquisition apparatuses symmetrically on a center extension line of the crystallizer nozzle, center the crystallizer nozzle in a thickness direction using the second image acquisition apparatuses, and obtain a thickness centering result;
a thickness centering module, configured to center the crystallizer nozzle in the thickness direction using the second image acquisition apparatuses, and obtain the thickness centering result; and
a position adjusting module, configured to adjust a position of a tundish car according to the width centering result and the thickness centering result.

In the embodiment of the present application, the crystallizer nozzle centering system can automatically perform a centering operation on the crystallizer nozzle without the need for manual intervention, which improves the production efficiency and reduces the labor cost. Through the first acquisition module and the second acquisition module, the system may acquire images of the crystallizer nozzle in real time, monitor the position and shape of the tundish car lower nozzle and the crystallizer nozzle in real time, and perform processing and analysis, so as to ensure the safety and stability of the continuous casting process. A centerline extraction is performed using edge enhancement and edge extraction technologies combined with the morphological closing operation, which can realize high-precision centering of the crystallizer nozzle and ensure the centering accuracy of the crystallizer nozzle in the width and thickness directions, improving the consistency and quality of the product. According to the width centering result and thickness centering result, the position of the tundish car can be adjusted in real time, so as to maintain a centering state of the crystallizer nozzle, which makes the crystallizer nozzle centering system able to respond quickly to changes in the production process, and ensures the stability of the continuous casting process and the quality of the product.

The present disclosure provides a computer readable storage medium, storing computer instructions, and the computer instructions cause a computer to realize the crystallizer nozzle centering method as described above.

The present disclosure provides an electronic device, including: at least one processor, at least one memory, a communication interface, and a bus. The processor, the memory, and the communication interface complete communications with one another through the bus. The memory stores program instructions that can be executed by the processor, and the processor calls the program instructions to realize the crystallizer nozzle centering method as described above.

The above describes the preferred embodiments of the present invention and is not intended to limit the present invention. Any modification, equivalent replacement, and improvement made within the spirit and scope of the present invention shall fall within the protection scope of the present invention.

What is claimed is:

1. A machine vision-based crystallizer nozzle centering method, comprising the following steps:

S1, installing a first image acquisition apparatus on a continuous casting platform to perform image acquisition on a tundish car lower nozzle and a crystallizer nozzle, and obtaining an initial image of the tundish car lower nozzle and an initial image of the crystallizer nozzle; wherein the continuous casting platform is further provided with a tundish car and a crystallizer;

S2, performing an edge enhancement on the initial image of the tundish car lower nozzle and the initial image of the crystallizer nozzle respectively using guide image filtering, and obtaining a first image set;

S3, performing an edge extraction on the first image set using an ant algorithm, and obtaining a second image set;

S4, performing smoothing processing and a centerline extraction on the second image set using a morphological closing operation respectively, and obtaining a centerline equation of an edge image of the tundish car lower nozzle and a centerline equation of an edge image of the crystallizer nozzle;

S5, centering the crystallizer nozzle in a width direction according to the centerline equation of the edge image of the tundish car lower nozzle and the centerline equation of the edge image of the crystallizer nozzle, and obtaining a width centering result;

S6, installing two second image acquisition apparatuses symmetrically on a center extension line of the crystallizer nozzle, centering the crystallizer nozzle in a thickness direction using the second image acquisition apparatuses, and obtaining a thickness centering result; and S7, adjusting a position of the tundish car on the continuous casting platform according to the width centering result and the thickness centering result;

step S3 specifically comprises:

S31, any image is selected in the first image set, m nodes are selected in the image, the m nodes are used as ants, and a pheromone amount of pixels of the m ants is set to an initial value of 0.0001;

S32, a local intensity of a position where each ant is located is calculated, a transition rule is formulated according to the local intensity, and the m ants are moved to an acceptable neighborhood according to a volatilization rate of pheromones;

S33, perception of the ants is denoted using a heuristic function, and a neighborhood of each ant is selected according to the heuristic function;

S34, any ant is selected from the m ants to be moved to a position in its 8 neighborhoods according to the heuristic function, a pheromone concentration of each ant is updated, and a pheromone concentration of each node is estimated;

S35, a second image is determined according to the pheromone concentration of the node and a movement path of the ant, and steps S31-S32 are repeated until all second images corresponding to the first image set are determined and constitute the second image set.

2. The machine vision-based crystallizer nozzle centering method according to claim 1, wherein the transition rule in step S32 is formulated according to the pheromone concentration and the heuristic function, wherein an expression of the heuristic function is as follows:

$$\eta_{u,v} = (\max[\eta_1, \eta_2, \eta_3])^2 \frac{1}{1 + (I\eta_{max})^2}$$

where $\eta_{u,v}$ denotes the heuristic function, $\eta_1$ denotes a difference of an image intensity of a first node, $\eta_2$ denotes a difference of an image intensity of a second node, $\eta_3$ denotes a difference of an image intensity of a third node, $I\eta_{max}$ denotes a maximal intensity value among the three image nodes, and the first node, the second node, and the third node are three nodes moved randomly by the ants.

3. The machine vision-based crystallizer nozzle centering method according to claim 1, wherein in step S32, a probability that the ant is moved to the acceptable neighborhood according to the volatilization rate of the pheromones is calculated by a formula:

$$p^n_{(i,j)(u,v)} = \begin{cases} \frac{(\tau^{(n-1)}_{(u,v)})^\alpha (\eta_{u,v})^\beta (\sigma_{u,v})^\gamma}{\sum_{(u,v)\in\Omega(u,v)}((\tau^{(n-1)}_{(u,v)})^\alpha (\eta_{u,v})^\beta (\sigma_{u,v})^\gamma)} & \text{if } (u,v) \in \Omega(i,j) \\ 0 & \text{otherwise} \end{cases}$$

where $p_{(i,j)(u,v)}^n$ denotes a probability that the ant is moved to an acceptable neighborhood (i,j) for an $n^{th}$ time at a node (u,v), $\tau_{(u,v)}^{(n-1)}$ denotes a pheromone amount at the node (u,v) for an $(n-1)^{th}$ time, $\eta_{u,v}$ denotes a heuristic informative value of the node (u,v), $\sigma_{u,v}$ denotes an adjustment parameter at the node (u,v), $\alpha$ denotes an importance degree of a pheromone, $\beta$ denotes an importance degree of information in the heuristic function, $\gamma$ denotes a coefficient of the adjustment parameter, $\Omega(i, j)$ denotes an acceptable neighborhood of the ant, and $\Omega(u, v)$ denotes a set of neighboring pixel points that the ant may be moved to from a current pixel point;

a formula for the adjustment parameter $\sigma_{u,v}$ is as follows:

$$\sigma_{u,v} = \sqrt{\frac{\log(R_k^{N_c})}{d_{i,j} \times \phi_{N_c}^2}}$$

where $d_{i,j}$ denotes an ideal attribute value of the adjustment parameter, $\phi_{N_c}$ denotes a sub-block gradient ratio, and $R_k^{N_c}$ denotes a threshold of a $k^{th}$ ant at an $N_c^{th}$ time.

4. The machine vision-based crystallizer nozzle centering method according to claim 1, wherein step S4 specifically comprises:

S41, an expansion operation and an erosion operation are performed on the second image set respectively, and a third image set is obtained;

S42, a gray value and a position of a gray gravity center are obtained for the third image set respectively, and a position of a gray gravity center of a pixel point on the edge image of the tundish car lower nozzle and a position of a gray gravity center of a pixel point on the edge image of the crystallizer nozzle are obtained;

S43, the position of the gray gravity center of the pixel point on the edge image of the tundish car lower nozzle and the position of the gray gravity center of the pixel point on the edge image of the crystallizer nozzle are fitted using a least square method respectively, and the centerline equation of the edge image of the tundish car lower nozzle and the centerline equation of the edge image of the crystallizer nozzle are obtained.

5. The machine vision-based crystallizer nozzle centering method according to claim 1, wherein step S6 specifically comprises:

S61, the two second image acquisition apparatuses are symmetrically installed on the center extension line in a horizontal width direction of the crystallizer of the continuous casting platform;

S62, the tundish car lower nozzle is centered with the crystallizer nozzle in the width direction, so that the tundish car lower nozzle is located on the centerline of the crystallizer nozzle;

S63, distances between a bus of the tundish car lower nozzle and the second image acquisition apparatuses are measured using the second image acquisition apparatuses, and a first distance and a second distance are obtained; wherein the first distance and the second distance are the distances between the tundish car lower nozzle and the two second image acquisition apparatuses respectively;

S64, the crystallizer nozzle is centered in the thickness direction according to the first distance and the second distance, and the thickness centering result is obtained.

6. The machine vision-based crystallizer nozzle centering method according to claim 5, wherein the second image acquisition apparatuses are laser sensors, and laser ranging centering is used for the crystallizer nozzle in the thickness direction.

* * * * *